(12) United States Patent
Lin

(10) Patent No.: US 8,307,736 B2
(45) Date of Patent: Nov. 13, 2012

(54) ADJUSTABLE BICYCLE HANDLEBAR

(76) Inventor: Chang Hui Lin, Changhua Hsien (TW)

( * ) Notice: Subject to any disclaimer, the term of this patent is extended or adjusted under 35 U.S.C. 154(b) by 90 days.

(21) Appl. No.: 13/065,457

(22) Filed: Mar. 22, 2011

(65) Prior Publication Data

US 2012/0240719 A1    Sep. 27, 2012

(51) Int. Cl.
*B62K 21/16* (2006.01)
(52) U.S. Cl. ................ 74/551.4; 74/551.3; 74/551.8; 403/314
(58) Field of Classification Search ...... 74/551.1–551.8; 403/314, 320, 409.1
See application file for complete search history.

(56) References Cited

U.S. PATENT DOCUMENTS

| | | | | |
|---|---|---|---|---|
| 292,077 | A | * | 1/1884 | Waggoner ........................ 403/91 |
| 610,469 | A | * | 9/1898 | Blashfield ...................... 74/551.4 |
| 1,756,339 | A | * | 4/1930 | Broberg ........................ 74/551.4 |
| 3,863,521 | A | * | 2/1975 | Gatsos et al. ................ 74/551.4 |
| 4,361,057 | A | * | 11/1982 | Kochera ........................ 74/551.4 |
| 4,682,509 | A | * | 7/1987 | Takamiya et al. ............ 74/551.4 |
| 4,873,886 | A | | 10/1989 | Renner |
| 5,033,325 | A | | 7/1991 | Giard, Jr. |
| 5,154,095 | A | | 10/1992 | Giard, Jr. |
| 5,197,350 | A | | 3/1993 | Borromeo |
| 5,235,871 | A | | 8/1993 | Yamazaki et al. |
| 5,247,852 | A | | 9/1993 | Guerr |
| 6,053,655 | A | * | 4/2000 | Mazhar ........................ 403/320 |
| 7,213,485 | B2 | * | 5/2007 | Huang ........................ 74/551.8 |
| 7,698,967 | B2 | * | 4/2010 | Ording et al. ................ 74/551.8 |
| 2005/0132839 | A1 | * | 6/2005 | Chen ........................... 74/551.8 |
| 2006/0096408 | A1 | * | 5/2006 | Liao ............................ 74/551.1 |
| 2006/0186019 | A1 | * | 8/2006 | Lu ................................ 206/581 |
| 2011/0176859 | A1 | * | 7/2011 | Chu ............................ 403/91 |

FOREIGN PATENT DOCUMENTS

| | | | |
|---|---|---|---|
| CN | 201132574 Y | * | 10/2008 |
| CN | 201132576 Y | * | 10/2008 |
| CN | 201132577 Y | * | 10/2008 |

* cited by examiner

*Primary Examiner* — Richard W Ridley
*Assistant Examiner* — William Santosa
(74) *Attorney, Agent, or Firm* — Charles E. Baxley

(57) ABSTRACT

A bicycle handlebar includes a cylinder having two collars formed on each end portion, two arms each having a barrel disposed between the collars, two bars engaged through the collars and the barrels of the arms for pivotally connecting the arms to the cylinder, and two followers engaged into the cylinder and movable relative to the cylinder for moving the barrels of the arms to clamp and retain the bars to the cylinder at the selected position and to retain the barrels of the arms at the selected angular position relative to the cylinder, the arms are adjustable relative to the cylinder to the selected angular position and the bars are movable relative to the cylinder to the selected position when the followers are released.

10 Claims, 7 Drawing Sheets

ADJUSTABLE BICYCLE HANDLEBAR

BACKGROUND OF THE INVENTION

1. Field of the Invention

The present invention relates to a bicycle handlebar, and more particularly to an adjustable bicycle handlebar including an adjustable structure adjustable forwardly and rearwardly relative to the supporting bicycle and adjustable upwardly and downwardly relative to the supporting bicycle to the selected or suitable angular position.

2. Description of the Prior Art

Typical bicycle handlebars comprise an auxiliary handlebar attached or mounted or secured to the primary handlebar with an adjustable connection or linkage.

For example, U.S. Pat. No. 4,873,886 to Renner, U.S. Pat. No. 5,033,325 to Giard, Jr., U.S. Pat. No. 5,154,095 to Giard, Jr., U.S. Pat. No. 5,197,350 to Borromeo, U.S. Pat. No. 5,235,871 to Yamazaki et al., and U.S. Pat. No. 5,247,852 to Guerr disclose several of the typical bicycle handlebars comprising a linkage for adjustably attaching an auxiliary handlebar having tubular ends to a primary bicycle handlebar.

However, the typical bicycle handlebar may not be adjusted forwardly and rearwardly relative to the supporting bicycle and may not be adjusted upwardly and downwardly relative to the supporting bicycle to the selected or suitable angular position.

The present invention has arisen to mitigate and/or obviate the afore-described disadvantages of the conventional adjustable bicycle handlebars.

SUMMARY OF THE INVENTION

The primary objective of the present invention is to provide an adjustable bicycle handlebar including an adjustable structure adjustable forwardly and rearwardly relative to the supporting bicycle and adjustable upwardly and downwardly relative to the supporting bicycle to the selected or suitable or required angular position.

In accordance with one aspect of the invention, there is provided a bicycle handlebar comprising a cylinder including a chamber formed therein and including two end portions each having two collars provided thereon, two arms disposed beside the cylinder and each including a barrel disposed between the collars of the cylinder respectively, two bars engaged through the collars and the barrels of the arms for pivotally connecting the arms to the cylinder respectively, and two followers engaged into the chamber of the cylinder and movable relative to the cylinder for selectively moving the barrels of the arms to clamp and retain the bars to the cylinder, the arms are adjustable relative to the cylinder to a selected angular position and the bars are movable relative to the cylinder to a selected position when the barrels of the arms are not moved away from the cylinder.

The followers each include a depression formed in an outer end portion thereof for receiving and engaging with the barrel of the arm respectively. The followers each include a cushioning member disposed on an outer end portion thereof, and the barrels of the arms each include a cushioning member for engaging with the cushioning member of the follower.

The cylinder includes two forcing members disposed in the chamber of the cylinder and engaged with the follower for selectively moving the followers to engage with the barrels of the arms.

The followers each include two inclined surfaces formed thereon, and the forcing members each also include two inclined surfaces formed thereon for engaging with the inclined surfaces of the followers and for selectively moving the followers toward the barrels of the arms when the forcing members are moved toward each other.

The cylinder includes a forcing element engaged with the forcing members for selectively moving the forcing members toward each other. The forcing element is a fastener engaged through one of the forcing members and threaded with the other forcing member.

The arms each include an auxiliary handlebar attached thereto. The auxiliary handlebar each include a casing having a compartment formed therein for receiving and engaging with an outer end portion of the arm.

Two tubes may further be provided and engaged through the collars and the barrels respectively and each tube including a bore formed therein for receiving and engaging with the bars respectively, and each tube including a slit formed therein for forming a resilient structure to the tube.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
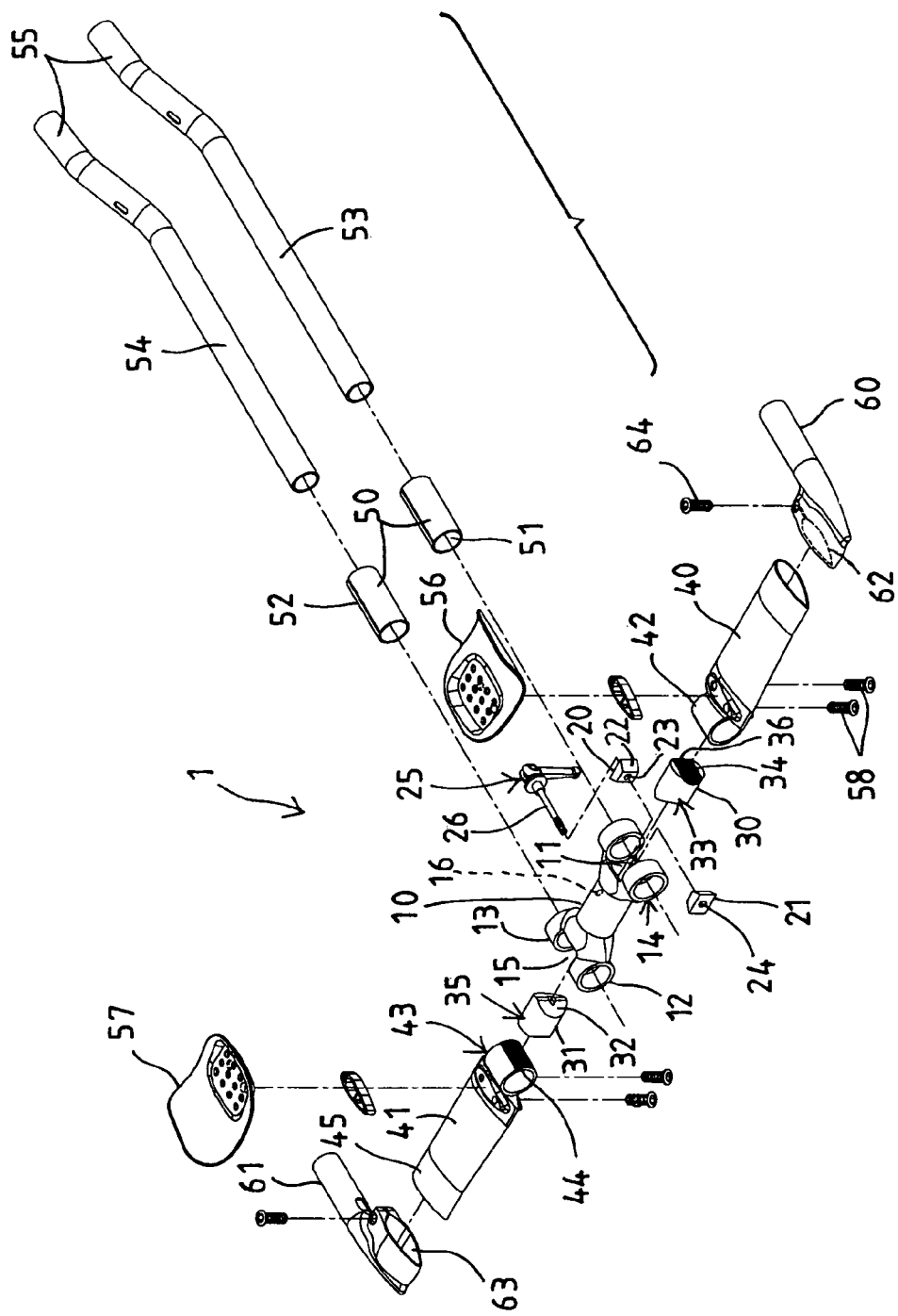
FIG. 1 is an exploded view of an adjustable bicycle handlebar in accordance with the present invention.
Figure 2:
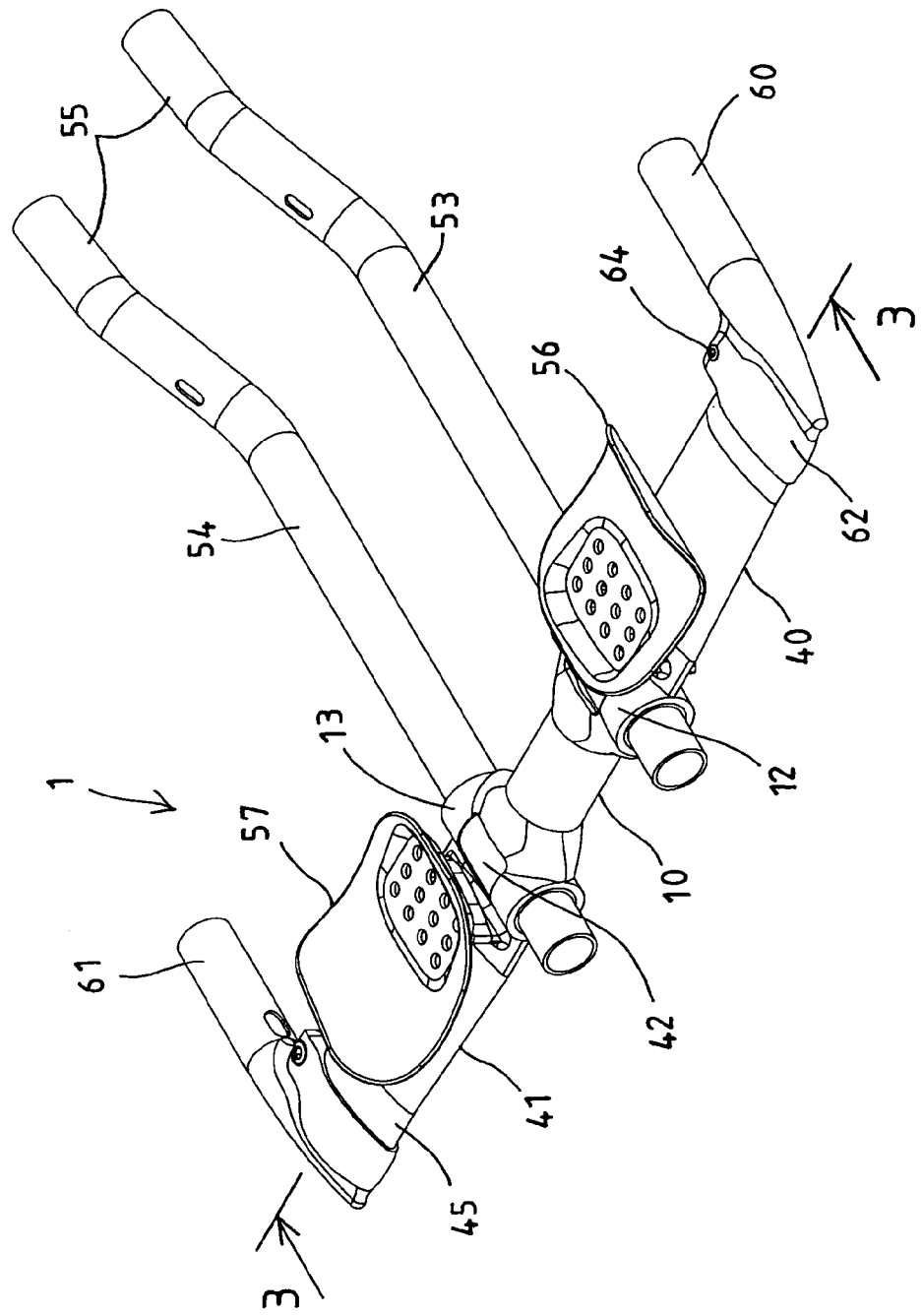
FIG. 2 is a perspective view of the adjustable bicycle handlebar.

Referring to the drawings, and initially to FIGS. 1-4, an adjustable bicycle handlebar 1 in accordance with the present invention comprises a central lateral cylinder 10 for attaching or mounting or securing onto a forwardly extending bar of a bicycle (not shown), the cylinder 10 includes a bore or chamber 11 formed therein (FIGS. 1, 3), and includes two collars 12, 13 formed or provided or extended on each of the end portions 14 of the cylinder 10, in which the collars 12, 13 at each end portion 14 of the cylinder 10 are spaced from each other for forming or defining a space 15 between the collars 12, 13, and the space 15 is communicative with the chamber 11 of the cylinder 10, the cylinder 10 further includes an orifice 16 formed therein (FIG. 1) and also communicative with the chamber 11 of the cylinder 10.

Two wedges or forcing members 20, 21 are disposed or engaged into the chamber 11 of the cylinder 10, and the first forcing member 20 is disposed or arranged or located in front of the second forcing member 21, the forcing members 20, 21 each include one or more (such as two) tilted or inclined forcing surfaces 22 formed or provided thereon (FIG. 1), such as formed in the two side portions thereof, and the first forcing member 20 includes an aperture 23 formed therein and aligned with the orifice 16 of the cylinder 10 for receiving or engaging with a fastener or forcing element 26, and the second forcing member 21 includes an inner thread or a screw hole 24 formed therein and aligned with the aperture 23 of the first forcing member 20 for threading or engaging with the fastener or forcing element 26.

Figure 7:
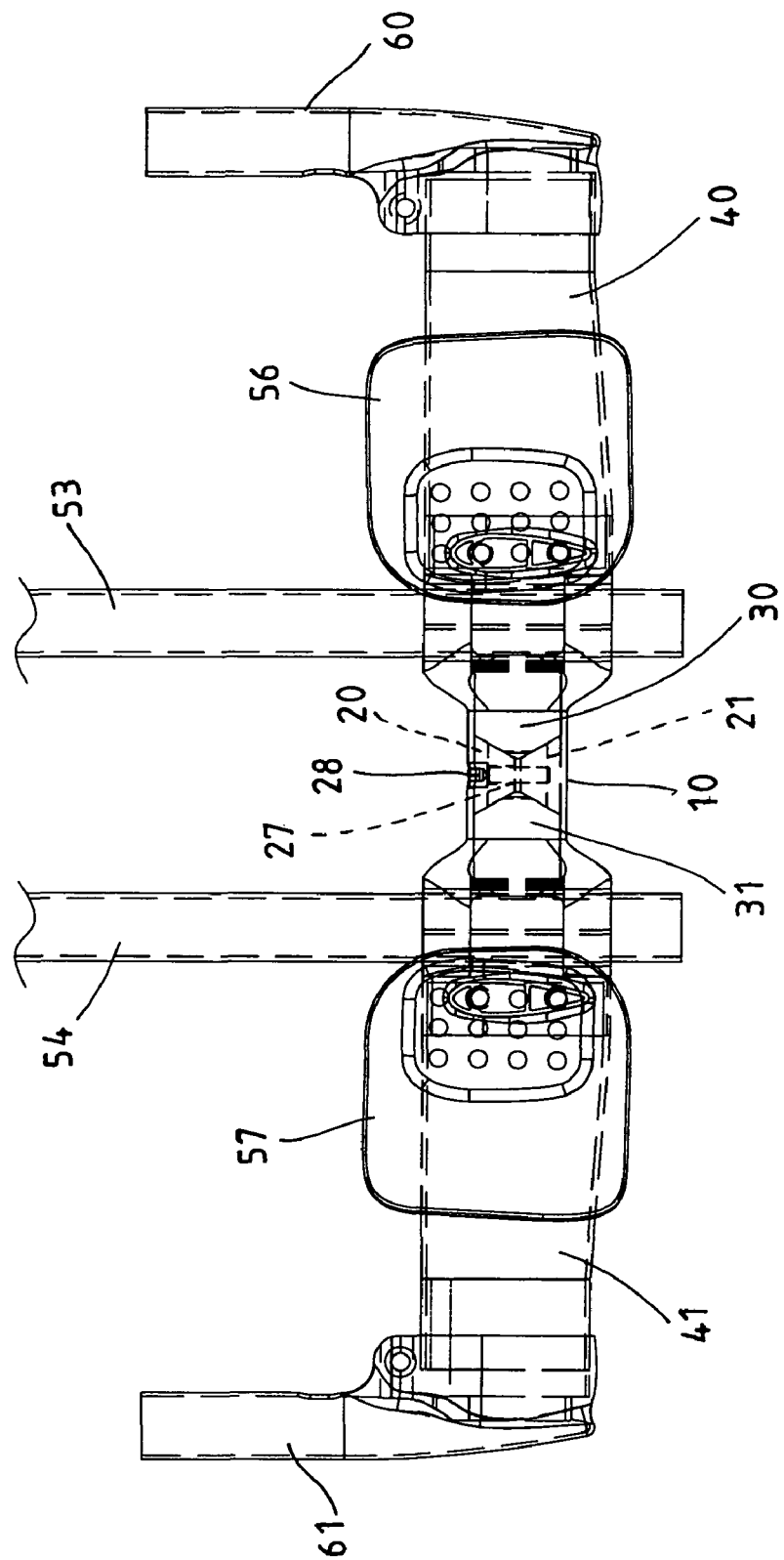
FIG. 7 is another partial top plan schematic view illustrating the other arrangement of the adjustable bicycle handlebar.

For example, the fastener or forcing element 26 is belong to a quick release device 25 and may be slidably engaged through the aperture 23 of the first forcing member 20 and may be threaded or engaged with the inner thread or a screw hole 24 of the second forcing member 21, such that the fastener or forcing element 26 may move the forcing members 20, 21 toward or away from each other. Alternatively, as shown in FIG. 7, the forcing element 27 may be selected from the other type of fastener 27, such as a fastener 27 having an engaging hole 28 formed therein and aligned with the orifice 16 of the cylinder 10 for receiving or engaging with a driving tool (not shown) which may drive or rotate the fastener 27 to move the forcing members 20, 21 toward or away from each other.

Two further wedges or followers 30, 31 are movably disposed or engaged into the chamber 11 of the cylinder 10 and disposed or arranged or located in the end portions 14 of the cylinder 10 respectively or located beside the forcing members 20, 21, or the forcing members 20, 21 are disposed or arranged or located between the followers 30, 31, and the followers 30, 31 each include two tilted or inclined forcing surfaces 32 formed or provided thereon, such as formed in the inner end portion 33 thereof for engaging with the tilted or inclined forcing surfaces 22 of the forcing members 20, 21 (FIG. 7), and for allowing the followers 30, 31 to be moved away from each other when the forcing members 20, 21 are moved or forced toward each other, and for allowing the followers 30, 31 to be moved toward each other when the forcing members 20, 21 are released or moved away from each other.

The followers 30, 31 each further include a curved depression 34 formed in the outer end portion 35 thereof, and each further include a pad or cushioning member 36 disposed or attached or mounted or secured in the outer end portion 35 thereof and disposed or arranged or located in the depression 34 of the respective follower 30, 31. The adjustable bicycle handlebar 1 further includes two extensions or arms 40, 41 disposed or arranged or located beside the cylinder 10, or the cylinder 10 is disposed or arranged or located between the arms 40, 41, and the arms 40, 41 each include a barrel 42 formed or provided or located in the inner end portion 43 thereof and received or engaged in the space 15 of the cylinder 10, and disposed or arranged or located between the collars 12, 13 for selectively engaging with the followers 30, 31.

Two tubes 50 are engaged through the collars 12, 13 and the barrel 42 respectively for pivotally or rotatably connecting or coupling or anchoring or securing or retaining the arms 40, 41 to the cylinder 10 respectively, and each include a bore 51 formed therein, and each include a slit 52 formed therethrough and communicative with the bore 51 of the tube 50 for forming a resilient structure to the tube 50, and for allowing the tubes 50 to be suitably clamped or squeezed or deformed. Two bars 53, 54 are slidably engaged through the bores 51 of the tubes 50 respectively or directly engaged through the collars 12, 13 and the barrel 42 respectively for pivotally connecting the arms 40, 41 to the cylinder 10 respectively, and each include a hand grip 55 formed or provided on the front end portion thereof for being grasped or gripped or held by the user. The bars 53, 54 may be moved forwardly and rearwardly relative to the cylinder 10 when the followers 30, 31 are released and may be solidly and stably clamped and anchored or secured or retained to the cylinder 10 when the tubes 50 are clamped or squeezed or deformed by the followers 30, 31 and the barrels 42 of the arms 40, 41. Alternatively, the bars 53, 54 may also be secured to the cylinder 10 directly by the followers 30, 31 and the barrels 42 of the arms 40, 41 without the tubes 50.

Figure 3:
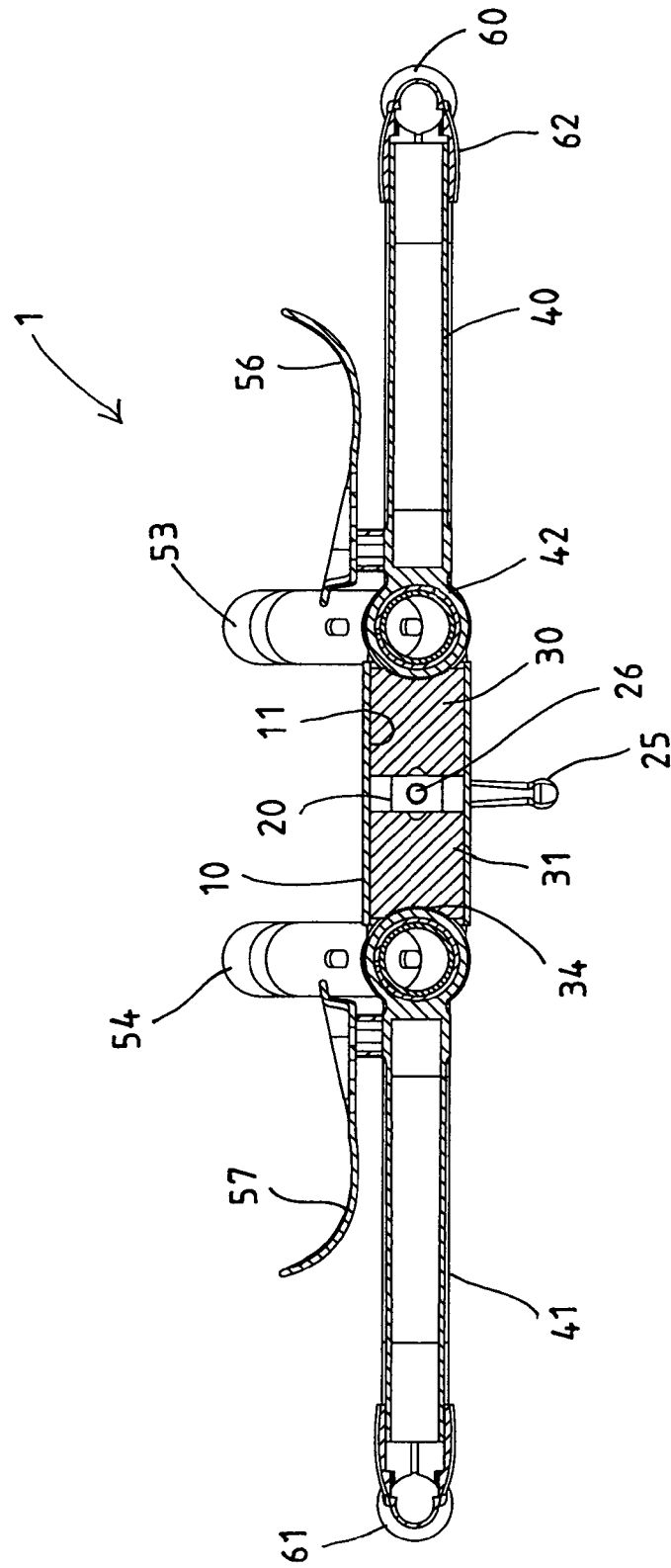
FIG. 3 is a partial cross sectional view of the adjustable bicycle handlebar, taken along lines 3-3 of FIG. 2.
Figure 4:
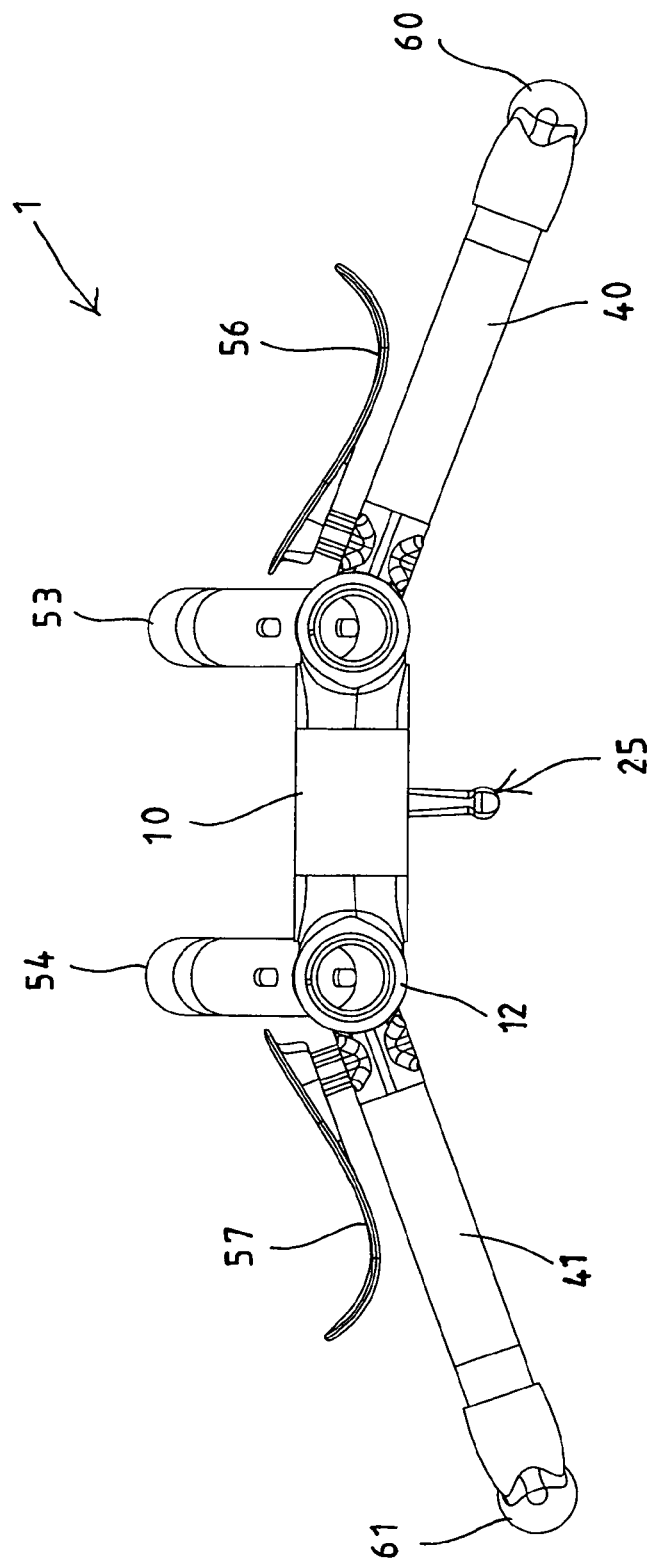
FIG. 4 is a front plan schematic view of the adjustable bicycle handlebar.
Figure 5:
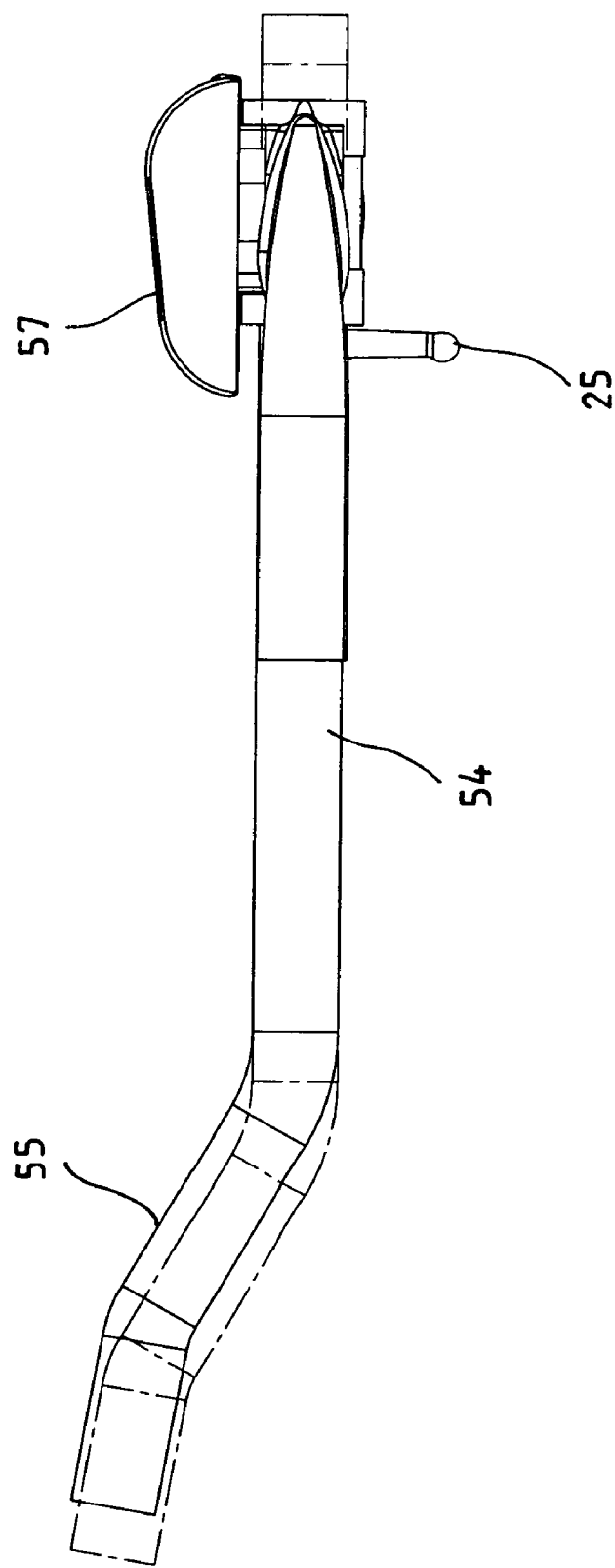
FIG. 5 is a partial side plan schematic view illustrating the operation of the adjustable bicycle handlebar.
Figure 6:
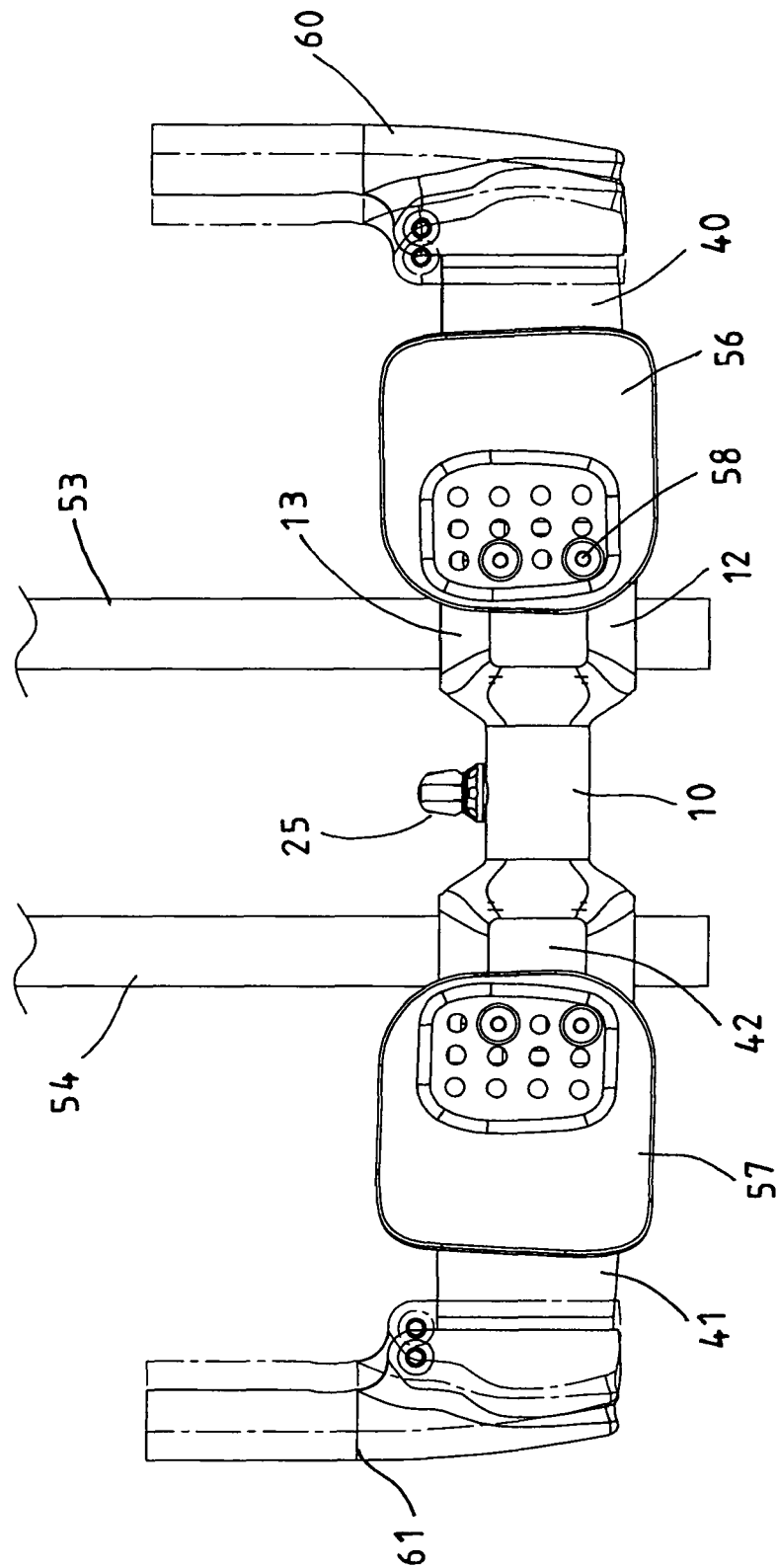
FIG. 6 is a partial top plan schematic view illustrating the operation of the adjustable bicycle handlebar.

The arms 40, 41 each include a pad or cushioning member 44 disposed or attached or mounted or secured onto the outer peripheral portion thereof for selectively engaging with the pad or cushioning member 36 of the follower 30, 31 respectively and for frictionally anchoring or securing or retaining the barrels 42 of the arms 40, 41 to the cylinder 10 at the selected or required angular position (FIGS. 3, 4, 6). Two deformations 56, 57 are attached or mounted or secured to the arms 40, 41 respectively for engaging with or for supporting the elbows of the users. In operation, the barrels 42 of the arms 40, 41 may be forced or moved away from the cylinder 10 by the followers 30, 31 respectively, and the tubes 50 may be clamped or squeezed or deformed by the followers 30, 31 and the barrels 42 of the arms 40, 41 in order to frictionally anchor or secure or retain the barrels 42 of the arms 40, 41 to the cylinder 10 at the selected or required angular position, and so as to solidly and stably clamp and anchor or secure or retain the bars 53, 54 to the cylinder 10 at the selected or required position or location (FIG. 5).

It is preferable that the arms 40, 41 each include an airfoil structure or cross section (FIG. 1) for decreasing the resistance to the arms 40, 41, and the arms 40, 41 each include an outer end portion 45. Two auxiliary handlebars 60, 61 may further be provided and each include a casing 62 having a compartment 63 formed therein for receiving or engaging with the outer end portion 45 of the respective arm 40, 41, and the casing 62 is mounted or secured to the arm 40, 41 with one or more fasteners 64, the auxiliary handlebars 60, 61 may also be provided for being grasped or gripped or held by the user when required.

In operation, as shown in FIGS. 3 and 4, the barrels 42 and the arms 40, 41 may be pivoted or rotated or adjusted relative to the cylinder 10 to the selected or required angular position when the fastener or forcing element 26 is released, and the bars 53, 54 may also be moved or adjusted relative to the cylinder 10 to the selected or required position or location at this moment. The barrels 42 of the arms 40, 41 may be forced or moved away from the cylinder 10 with the fastener or forcing element 26 and by the followers 30, 31 respectively, and the tubes 50 may be clamped or squeezed or deformed by the followers 30, 31 and the barrels 42 of the arms 40, 41 in order to frictionally anchor or secure or retain the barrels 42 of the arms 40, 41 to the cylinder 10 at the selected or required angular position, and so as to solidly and stably clamp and anchor or secure or retain the bars 53, 54 to the cylinder 10 at the selected or required position or location.

Accordingly, the adjustable bicycle handlebar in accordance with the present invention includes an adjustable structure adjustable forwardly and rearwardly relative to the supporting bicycle and adjustable upwardly and downwardly relative to the supporting bicycle to the selected or suitable angular position.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle handlebar comprising:
a cylinder including a chamber formed therein and including two end portions each having two collars provided thereon, two arms disposed beside said cylinder and each including a barrel disposed between said collars of said cylinder respectively, two bars engaged through said collars and said barrels of said arms for pivotally connecting said arms to said cylinder respectively, and two followers engaged into said chamber of said cylinder and movable relative to said cylinder for selectively moving said barrels of said arms to clamp and retain said bars to said cylinder, said arms being adjustable relative to said cylinder to a selected angular position and said bars being movable relative to said cylinder to a selected position when said barrels of said arms are not moved away from said cylinder.

2. The bicycle handlebar as claimed in claim 1, wherein said followers each include a depression formed in an outer end portion thereof for receiving and engaging with said barrel of said arm respectively.

3. The bicycle handlebar as claimed in claim 1, wherein said followers each include a cushioning member disposed on an outer end portion thereof, and said barrels of said arms each include a cushioning member for engaging with said cushioning member of said follower.

4. The bicycle handlebar as claimed in claim 1, wherein said cylinder includes two forcing members disposed in said chamber of said cylinder and engaged with said follower for selectively moving said followers to engage with said barrels of said arms.

5. The bicycle handlebar as claimed in claim 4, wherein said followers each include two inclined surfaces formed thereon, and said forcing members each include two inclined surfaces formed thereon for engaging with said inclined surfaces of said followers and for moving said followers toward said barrels of said arms when said forcing members are moved toward each other.

6. The bicycle handlebar as claimed in claim 5, wherein said cylinder includes a forcing element engaged with said forcing members for selectively moving said forcing members toward each other.

7. The bicycle handlebar as claimed in claim 6, wherein said forcing element is a fastener engaged through one of said forcing members and threaded with the other forcing member.

8. The bicycle handlebar as claimed in claim 1, wherein said arms each include an auxiliary handlebar attached thereto.

9. The bicycle handlebar as claimed in claim 8, wherein said auxiliary handlebar each include a casing having a compartment formed therein for receiving and engaging with an outer end portion of said arm.

10. The bicycle handlebar as claimed in claim 1 further comprising two tubes engaged through said collars and said barrels respectively and each tube including a bore formed therein for receiving and engaging with said bars respectively, and each tube including a slit formed therein for forming a resilient structure to said tube.

* * * * *